United States Patent
Geier et al.

(10) Patent No.: US 11,992,375 B2
(45) Date of Patent: May 28, 2024

(54) PROCESS FOR GENERATING A CAM DATASET

(71) Applicant: Ivoclar Vivadent AG, Schaan (LI)

(72) Inventors: Markus Geier, Tisens (IT); Martin Mitterhofer, Latsch (IT)

(73) Assignee: Ivoclar Vivadent AG, Schaan (LI)

( * ) Notice: Subject to any disclaimer, the term of this patent is extended or adjusted under 35 U.S.C. 154(b) by 179 days.

(21) Appl. No.: 17/385,056

(22) Filed: Jul. 26, 2021

(65) Prior Publication Data

US 2022/0079721 A1 Mar. 17, 2022

(30) Foreign Application Priority Data

Sep. 16, 2020 (EP) .................................... 20196430

(51) Int. Cl.
| | |
|---|---|
| *A61C 13/00* | (2006.01) |
| *A61C 9/00* | (2006.01) |
| *A61C 13/08* | (2006.01) |
| *G05B 19/4093* | (2006.01) |
| *G06F 30/10* | (2020.01) |
| *G06F 113/10* | (2020.01) |

(52) U.S. Cl.
CPC ........ *A61C 13/0004* (2013.01); *A61C 9/0046* (2013.01); *A61C 13/0019* (2013.01); *A61C 13/08* (2013.01); *G05B 19/40937* (2013.01); *G06F 30/10* (2020.01); *G05B 2219/36283* (2013.01); *G05B 2219/45167* (2013.01); *G06F 2113/10* (2020.01)

(58) Field of Classification Search
CPC .............. A61C 13/0004; A61C 9/0046; A61C 13/0019; A61C 13/08; A61C 13/0022; G05B 19/40937; G05B 2219/36283; G05B 2219/45167; G05B 19/4097; G06F 30/10; G06F 2113/10; Y02P 90/02
See application file for complete search history.

(56) References Cited

U.S. PATENT DOCUMENTS

| | | |
|---|---|---|
| 10,646,311 B2 | 5/2020 | Watzke et al. |
| 10,779,916 B2 | 9/2020 | Klingenburg et al. |
| 10,838,398 B2 | 11/2020 | Leeson et al. |
| 10,849,725 B2 | 12/2020 | Korten et al. |
| 10,874,490 B2 | 12/2020 | Ruppert et al. |

(Continued)

OTHER PUBLICATIONS

3M, "Lava Scan ST Design System and Design Software 7", 2011 (Year: 2011).*

(Continued)

*Primary Examiner* — Chun Cao
*Assistant Examiner* — Tyler Dean Hedrick
(74) *Attorney, Agent, or Firm* — Ann M. Knab; Thad McMurray

(57) ABSTRACT

The present invention relates to a process for generating a CAM dataset, having the steps of providing (S201) a digital CAD dataset for a dental prosthesis having first reference data for a first spatial reference geometry; providing (S202) a digital CAM dataset having second reference data for a second spatial reference geometry; and integrating (S203) the CAD dataset in the CAM dataset by aligning the first spatial reference geometry of the CAD dataset with the second spatial reference geometry of the CAM dataset.

11 Claims, 3 Drawing Sheets

(56) References Cited

U.S. PATENT DOCUMENTS

2015/0335407 A1* 11/2015 Korten ................. A61C 13/082
                                                          264/20
2018/0071063 A1*  3/2018 Watzke ................. A61C 13/00
2019/0159875 A1*  5/2019 Schafer ............. A61C 13/0004
2020/0015944 A1   1/2020 Geier et al.
2020/0015947 A1   1/2020 Geier et al.
2021/0353394 A1* 11/2021 Lee ........................ A61C 13/34

OTHER PUBLICATIONS

Wikipedia, "Articulator", https://en.wikipedia.org/wiki/Articulator, Dec. 24, 2022.

\* cited by examiner

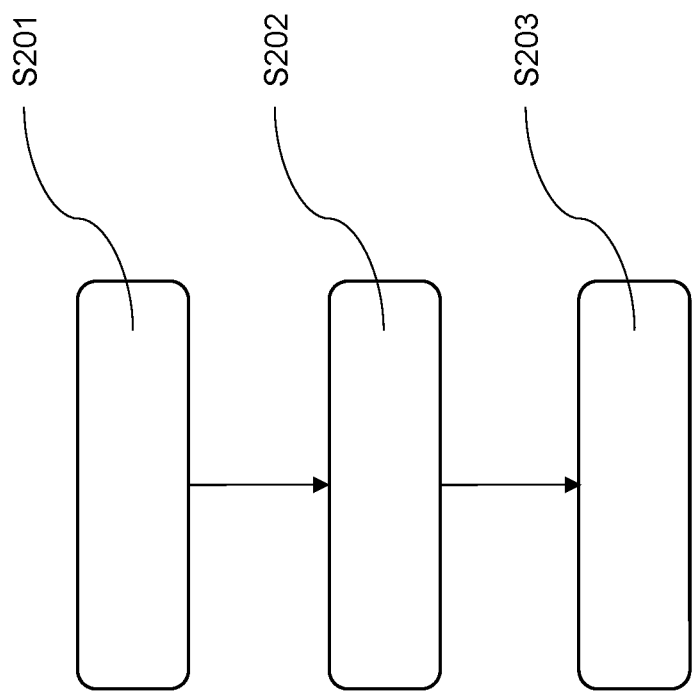

PROCESS FOR GENERATING A CAM DATASET

CROSS-REFERENCE TO RELATED APPLICATIONS

This application claims priority to European patent application No. 20196430.1 filed on Sep. 16, 2020, the disclosure of which is incorporated herein by reference in its entirety.

TECHNICAL FIELD

The present invention relates to a process for generating a CAM dataset and to a computer program for carrying out the process.

BACKGROUND

During the production of dental prostheses using a CAD process, inaccuracies arise which are caused because the CAD dataset of the dental prosthesis is imprecisely incorporated into a CAM dataset. U.S. Ser. Nos. 10/849,725, 10/838,398, 10/779,916, and 10/874,490 are directed to CAD/CAM processes in the manufacture of dental prostheses and are hereby incorporated by reference in their entirety.

SUMMARY

Therefore, it is the technical object of the present invention to improve the CAD production of a dental prosthesis.

This object is achieved by the technical subject matter of the independent claims. Further technically advantageous embodiments are the subject matter of the dependent claims, the description and the drawings.

According to a first aspect, the technical object is achieved by a process for generating a CAM dataset, including the steps of providing a digital CAD dataset for a dental prosthesis having first reference data for a first spatial reference geometry; providing a digital CAM dataset having second reference data for a second spatial reference geometry; and integrating the CAD dataset into the CAM dataset by aligning the first spatial reference geometry of the CAD dataset with the second spatial reference geometry of the CAM dataset. The reference geometry can be indicated by a reference geometry such as e.g. a reference cross. The process achieves the technical advantage that the CAD dataset can be integrated optimally into the CAM dataset and subsequent production of the dental prosthesis in a milling process is improved.

In a technically advantageous embodiment of the process, the CAM dataset includes data for a blank for producing the dental prosthesis. In this way, for example, the technical advantage is achieved in that the design of the dental prosthesis can be adapted to the blank in the best manner possible.

In a further technically advantageous embodiment of the process, the data for the blank render a circular disc. This has the technical advantage, for example, of reducing the amount of material required to manufacture the dental prosthesis.

In a further technically advantageous embodiment of the process, the data for the blank reproduce an inhomogeneous structure of the blank for generating a gingival impression. This has the technical advantage, for example, that a dental prosthesis with a realistic gingival margin can be produced in a simple manner.

In a further technically advantageous embodiment of the process, the inhomogeneous structure is formed by a waveform. This has the technical advantage, for example, that the waveform creates a realistic gum edge. U.S. Ser. No. 10/646,311, 20200015947 and 20200015944, directed to waveform-type blanks and methods of making and using, are hereby incorporated by reference in their entirety.

In a further technically advantageous embodiment of the process, the first and/or second spatial or circumferential reference geometry indicates a spatial or circumferential axis and/or a reference cross. This achieves the technical advantage, for example, that the two data sets can be effectively aligned with each other.

In a further technically advantageous embodiment of the process, the spatial axis is oriented perpendicularly to a surface of a blank. In this way, for example, the technical advantage achieved is that the dental prosthesis can be visualised more effectively.

In a further technically advantageous embodiment of the process, the CAM dataset can be selected from a plurality of previously stored CAM datasets. This has the technical advantage, for example, that different CAM data sets can be used which are adapted to the design of the dental prosthesis.

In a further technically advantageous embodiment of the process, the dental prosthesis is generated automatically on the basis of the CAM dataset. This has the technical advantage, for example, that the dental prosthesis can be produced quickly.

In a further technically advantageous embodiment of the process, the CAM dataset is converted into milling data for milling the dental prosthesis. In this way, for example, the technical advantage is that the dental prosthesis can be produced in a facile or simple manner.

In a further technically advantageous embodiment of the process, the dental prosthesis is milled on the basis of the milling data by a milling device. In this way, for example, the technical advantage is likewise achieved that the dental prosthesis can be produced simply or easily.

According to a second aspect, the technical object is achieved by a computer program product having program code which is stored on a non-transitory machine-readable medium, the machine-readable medium having computer instructions executable by a processor of a computer, which computer instructions cause the processor to execute the process according to any one of the process claims. The computer program achieves the same technical advantages as the process according to the first aspect.

In a preferred embodiment a process for generating a CAM dataset includes providing a digital CAD dataset for a dental prosthesis having first reference data for a first spatial reference geometry; providing a digital CAM dataset having second reference data for a second spatial reference geometry; and integrating the CAD dataset into the CAM dataset by aligning the first spatial reference geometry of the CAD dataset with the second spatial reference geometry of the CAM dataset. Preferably, the first and/or second spatial reference geometry indicates a spatial axis and/or a reference cross. Preferably, the spatial axis is oriented perpendicularly to a surface of a blank.

In a preferred embodiment, the CAM dataset includes data for a blank for producing the dental prosthesis. Preferably, the data for the blank render a circular disc. Preferably, the data for the blank render an inhomogeneous structure of the blank for generating a gum impression. Preferably, the inhomogeneous structure is formed by a waveform.

In a further preferred embodiment, the CAM dataset can be selected from a plurality of previously stored CAM datasets. Preferably, the dental prosthesis is generated automatically on the basis of the CAM dataset. Preferably, the CAM dataset is converted into milling data for milling the dental prosthesis. Preferably, the dental prosthesis is milled on the basis of the milling data by a milling device.

In a preferred embodiment, a computer program product is provided having program code which is stored on a non-transitory machine-readable medium, the machine-readable medium having computer instructions executable by a processor, which computer instructions cause the processor to perform the process for generating a CAM dataset as set forth above.

BRIEF DESCRIPTION OF THE DRAWINGS

Exemplified embodiments of the invention are illustrated in the drawings and are described in more detail hereinunder.

In the drawings:

FIG. 3 shows a block diagram of a process for generating a CAM dataset.

DETAILED DESCRIPTION

Figure 1:
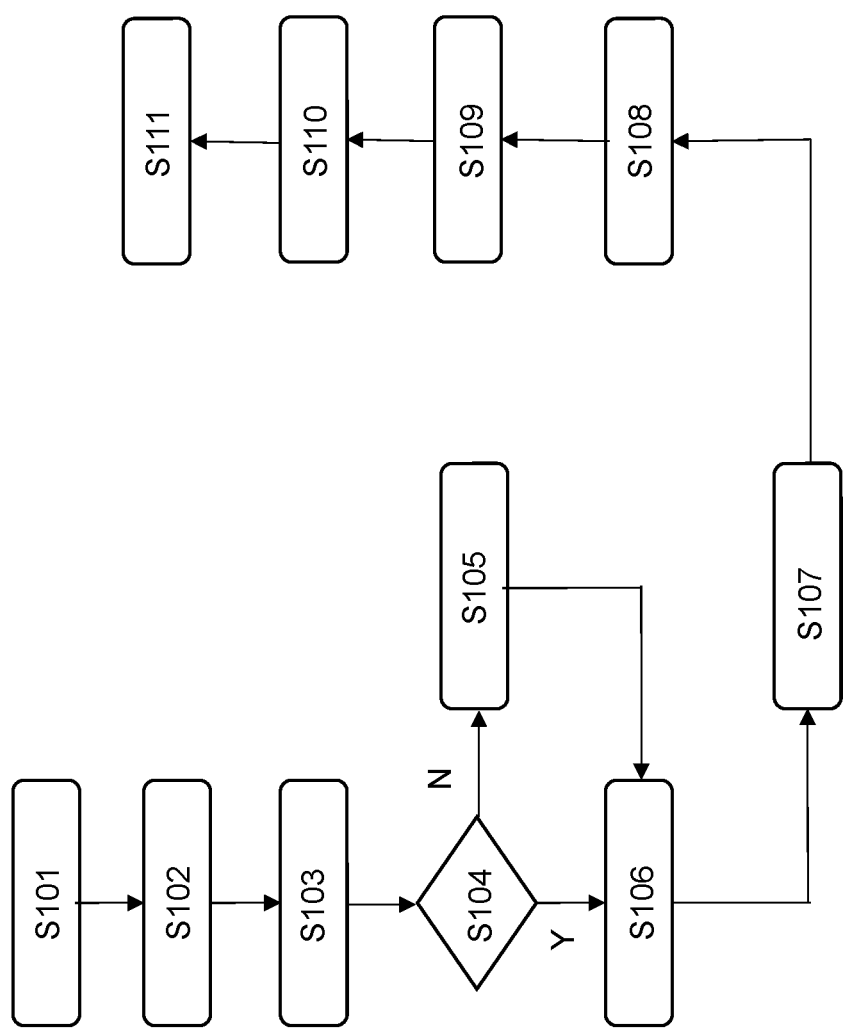
FIG. 1 shows a block diagram of a process for producing a dental prosthesis.

FIG. 1 shows a block diagram of a process for producing a dental prosthesis. In step S101, a reference geometry for a blank is imported, as a CAM dataset, into the dental CAD dataset indicating the spatial shape of the dental prosthesis. This represents e.g. the periphery or circumference and height of the disc of the blank. A waveform for generating a gum edge can likewise be visualised. The CAM dataset for the blank can indicate, in addition to the shape, the properties of the blank such as e.g. an inhomogeneous structure of the blank for generating a visual gum impression. This can be formed by a multicoloured blank having an inhomogeneous colour distribution (pink/white) in the waveform. However, the blank can also contain an inhomogeneous material distribution having a plurality of materials which is likewise rendered by the CAM dataset for the blank.

In step S102, a reference geometry is indicated, such as e.g. a reference cross which is used to align the prosthesis in the disc, i.e. the CAM dataset. The reference geometry can lie outside the spatial region of the dental prosthesis. The reference geometry can be predetermined in a separate dataset which is likewise imported into the CAD dataset. In general, other geometric shapes or structures can also be used as reference geometry. In step S103, the reference geometry is then aligned with the design of the prosthesis in the best manner possible.

In step S104 a check is made whether the profile of the tooth or that of the gingiva of the specification matches the provided geometry. If this is not the case, in step S105 the design is adapted with the tools of the CAD software such that the transition of the tooth or gingiva extends along the provided geometry.

If the check in step S104 is successful, then in step S106 the reference cross is aligned along the cross with the imported geometry and added to the prosthesis base.

In step S107, a file of the dental prosthesis is created in STL format. The dataset is hereby transformed. However, in general it is also possible to use other data formats which are suitable for a subsequent milling process. Metadata can also be integrated into the dataset for this purpose. In step S108, the CAD dataset for the dental prosthesis is imported into the CAM dataset for the blank.

In step S109, the dental prosthesis is aligned in the Z axis using the reference cross and in step S110 the dental prosthesis is aligned in the X and Y axes using the reference cross. Aligning is achieved by rotating and displacing the CAD dataset of the dental prosthesis. Then, the tooth specification of the dental prosthesis follows the inhomogeneous colour distribution in the waveform of the blank. As a result, an optimum aesthetic result can be achieved when milling. Aligning can be effected such that the spatial reference geometry of the CAD dataset is displaced and/or rotated with respect to the second spatial reference geometry of the CAM dataset.

In step S111, the data are approved for milling and the dental prosthesis is generated in a fully automated manner from the blank by a controlled milling device.

Figure 2:
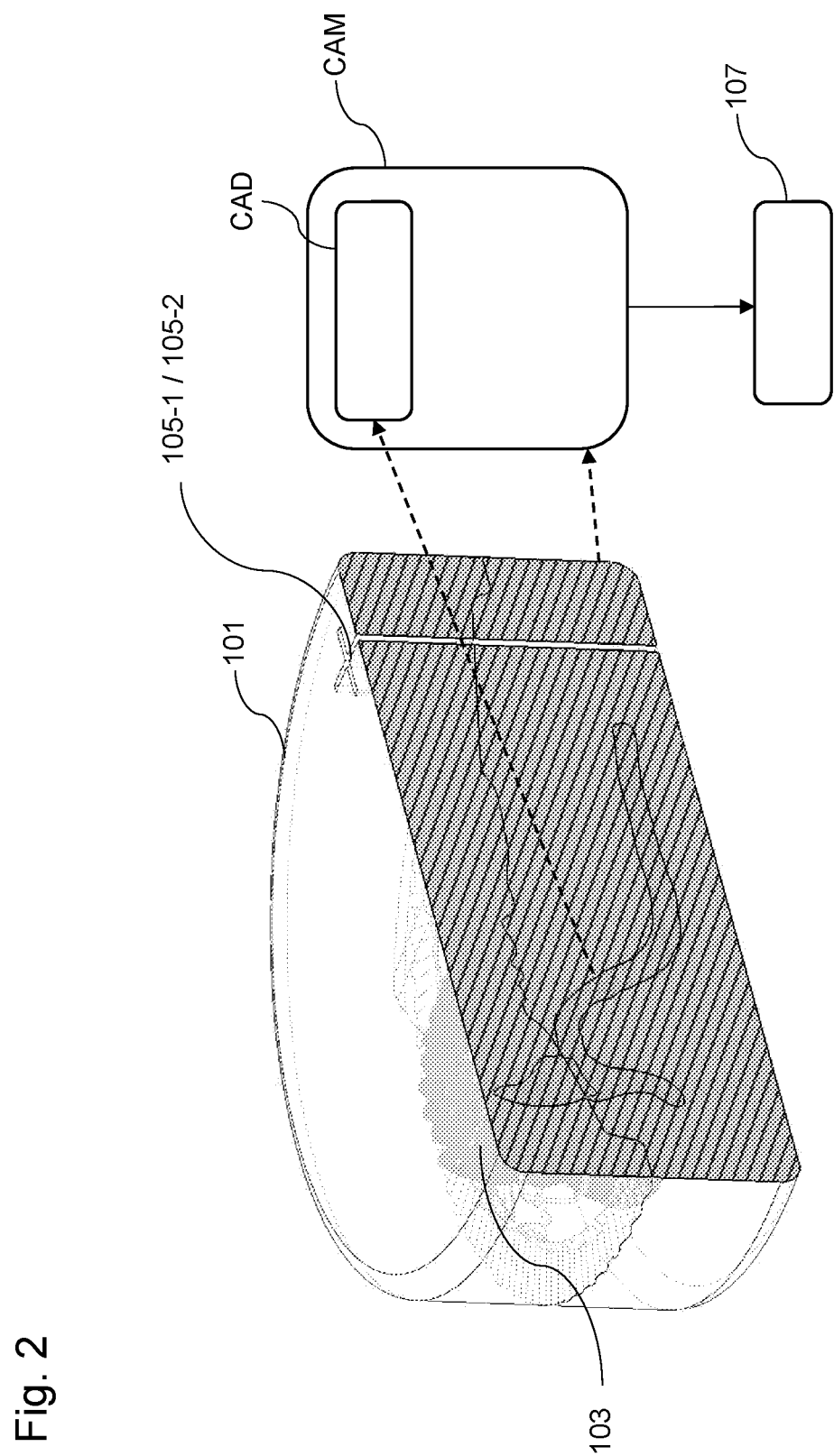
FIG. 2 shows a schematic illustration of a CAD dataset and a CAM dataset.

FIG. 2 shows a schematic illustration of a CAD dataset and a CAM dataset. The CAD dataset is the result of spatial planning and design of the dental prosthesis 103 by means of CAD software. During this planning and design, the shape and colour of the dental prosthesis 103 is fixed.

The CAM dataset reflects the shape and the properties of the blank 101 and is used to actuate cutting machines or 3D printers. For this purpose, the CAM dataset is transmitted e.g. to a milling device 107 which cuts the dental prosthesis 103 out of the blank 101 by means of a milling tool.

The CAD dataset CAD comprises data regarding a reference geometry 105-1 such as e.g. a reference cross or individual reference points. In a similar manner, the CAM dataset CAM also comprises predetermined data regarding a reference geometry 105-2 such as e.g. a reference cross or individual reference points. The two reference geometries 105-1 and 105-2 are used to align the CAD dataset CAD within the CAM dataset so that the design of the dental restoration can be aligned in the best manner possible. This occurs e.g. by rotating or displacing the CAD dataset about or along the reference geometries 105-1 and 105-2. In addition, the dental prosthesis 103 can be transmitted from the CAD software into the CAM software in the correct position.

As a result, the transfer of a design, such as e.g. a so-called Shell Disc prosthesis, from the CAD software into the CAM software in the correct position will be ensured. Using the reference geometry 105-1 which is integrated into the used Shell Disc geometry, the dental prosthesis 103 is integrated in the CAD software as the last step. The reference geometry 105-1 is a part of the dataset of the designed dental prosthesis 103.

A dataset for a Shell Disc having the same reference geometry 105-2 is stored in the CAM software. The designed dental prosthesis 103 having the reference geometry 105-1 can be imported and can be aligned, in the nesting using the reference geometry 105-1, with the particular reference geometry 105-2 of the Shell Disc. As a result, the spatial coordinates (X, Y, Z) of the dental prosthesis 103 are determined in the Shell Disc.

FIG. 3 shows a block diagram of a process for generating a CAM dataset. In a first step S201, a digital CAD dataset for a dental prosthesis is provided and comprises first reference data for a first spatial reference geometry. The reference data are e.g. data which indicate a particular spatial position within the CAD dataset. The spatial position can be predetermined by a reference geometry such as e.g. a reference cross.

In step S202, a digital CAM dataset having second reference data for a second spatial reference geometry is provided. In step 203, the CAD dataset is integrated into the CAM dataset by aligning the first spatial reference geometry of the CAD dataset with the second spatial reference geometry of the CAM dataset.

The process for generating a CAM dataset can be used to automatically and rapidly transfer the dental prosthesis 103 from the CAD software into the CAM software in the correct position.

All features explained and illustrated in conjunction with individual embodiments of the invention can be provided in a different combination in the subject matter in accordance with the invention in order to achieve the advantageous effects thereof at the same time.

All the process steps can be implemented by devices which are suitable for carrying out the respective process step. All functions which are carried out by features relating to the device can be a process step of a process.

In one or more embodiments, the present disclosure can be embodied as a system with a control device, embodied as a system that includes a processor, a memory, and a communications interface, such as in the form of a desktop computer, smartphone, tablet, laptop computer, personal digital assistant, or other computing device. The processor provides processing functionality for the control device and can include any number of processors, micro-controllers, Programmable Logic Controller (PLC), a Proportional-Integral-Derivative (PID) controller, and so forth or other processing systems, and resident or external memory for storing data and other information accessed or generated by the control device. The processor can execute one or more software programs that implement techniques described herein. The processor is not limited by the materials from which it is formed or the processing mechanisms employed therein and, as such, can be implemented via semiconductor(s) and/or transistors (e.g., using electronic integrated circuit (IC) components), and so forth.

In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The memory is an example of tangible, computer-readable storage medium that provides storage functionality to store various data associated with operation of the control device, such as software programs and/or code segments, or other data to instruct the processor, and possibly other components of the control device, to perform the functionality described herein.

Thus, the memory can store data, such as a program of instructions for operating the system (including its components), and so forth. In embodiments of the disclosure, the memory can be integral with the processor, can comprise stand-alone memory, or can be a combination of both.

The memory can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the cable and/or the memory can include removable integrated circuit card (ICC) memory, such as memory provided by a subscriber identity module (SIM) card, a universal subscriber identity module (USIM) card, a universal integrated circuit card (UICC), and so on.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A process for generating a CAM dataset (CAM), comprising:
    providing (S201) a digital CAD dataset (CAD) for a dental prosthesis (103) having first reference data for a first spatial reference geometry (105-1);
    providing (S202) a digital CAM dataset (CAM) having second reference data for a second spatial reference geometry (105-2);
    integrating (S203) the CAD dataset (CAD) into the CAM dataset (CAM) by aligning the first spatial reference geometry (105-1) of the CAD dataset (CAD) with the second spatial reference geometry (105-2) of the CAM dataset (CAM);
    wherein the first and/or second spatial reference geometry (105-1, 105-2) indicates a spatial axis and/or a reference cross; and
    milling the dental prosthesis (103).

2. The process as claimed in claim 1,
    wherein the CAM dataset (CAM) comprises data for a blank (101) for producing the dental prosthesis (103).

3. The process as claimed in claim 2,
    wherein the data for the blank (101) render a circular disc.

4. The process as claimed in claim 2,
    wherein the data for the blank (101) render an inhomogeneous structure of the blank (101) for generating a gum impression.

5. The process as claimed in claim 4,
    wherein the inhomogeneous structure is formed by a waveform.

6. The process as claimed in claim 1,
    wherein the spatial axis is oriented perpendicularly to a surface of a blank (101).

7. The process as claimed in claim 1,
    wherein the CAM dataset (CAM) can be selected from a plurality of previously stored CAM datasets.

8. The process as claimed in in claim 1,
    wherein the dental prosthesis (103) is generated automatically on the basis of the CAM-dataset (CAM).

9. The process as claimed in in claim 1,
    wherein the CAM dataset (CAM) is converted into milling data for milling the dental prosthesis.

10. The process as claimed in claim 9,
    wherein the dental prosthesis (103) is milled on the basis of the milling data by a milling device (107).

11. A computer program product comprising program code which is stored on a non-transitory machine-readable medium, the machine-readable medium comprising computer instructions executable by a processor, which computer instructions cause the processor to perform the process according to claim 1.

\* \* \* \* \*